United States Patent [19]
Roth et al.

[11] 3,953,116
[45] Apr. 27, 1976

[54] EXPOSURE METER FOR PHOTOGRAPHIC CAMERAS

[75] Inventors: Johann Roth, Schwabhausen; Robert Flandorfer, Munich, both of Germany

[73] Assignee: Braun Aktiengesellschaft, Frankfurt am Main, Germany

[22] Filed: Dec. 3, 1974

[21] Appl. No.: 529,045

[30] Foreign Application Priority Data
Dec. 4, 1973 Germany............................ 2360356

[52] U.S. Cl. ............................................. 352/141
[51] Int. Cl.² .......................................... G03B 7/08
[58] Field of Search ..................................... 352/141

[56] References Cited
UNITED STATES PATENTS
3,421,812   1/1969   Kubota ............................. 352/141

*Primary Examiner*—Monroe H. Hayes
*Attorney, Agent, or Firm*—Frederick E. Bartholy

[57] ABSTRACT

An exposure control arrangement for motion picture cameras of the type in which the diaphragm is set in accordance with the amount of light passing through the objective is described. The activation of the diaphragm is automatically effected by photoelectric means which are energized upon closure of the shutter and disabled during exposure of the film.

2 Claims, 4 Drawing Figures

EXPOSURE METER FOR PHOTOGRAPHIC CAMERAS

Motion picture cameras of the type which utilize a reflecting element attached to the shutter blade are known. When in rest position, they give a partial reflection on the photosensor. Consequently, either in the rest position or in motion of the blade, an equal integral amount of light reaches the photosensor. This type of arrangement has its drawbacks. Production costs for making the partially reflecting surface of the shutter are quite high and only about 40 – 50% of the available light is utilized for metering.

Moreover, arrangements have been used which, instead of the partially reflecting surface of the rotating blade, utilize a switch which, in the rest position of the shutter, reduces the sensitivity of the exposure measuring unit. This also has the drawback that the sensitivity of the exposure measuring element is not fully utilized.

The exposure control arrangement herein described is distinguished by the fact that a light reflecting element is attached to the shutter blade facing the objective lens and a photosensor is positioned to receive the light so reflected. In addition, there is a diaphragm control which, during exposure, cancels the effective operation of the photosensor.

Preferably, the reflecting element is so constructed as to provide diffused reflection. This has the advantage of considerably lower production cost since a diffuse reflector is a great deal simpler to make than a mirror-type. Moreover, a diffuse reflector may be made to have a desired color in order to correct the particular color sensitivity of the photosensor.

In accordance with a particular embodiment, the control arrangement consists of a measured light value storage element effective during exposure of the film. In this manner, the sensitivity of the light sensor is fully utilized inasmuch as it receives the maximum light intensity at the time when there is no exposure. On the other hand, during exposure, there is no interruption nor dimishing of the measured signal.

The signal storage element is switched on at the start of the signal and shut off at the fall of the signal. Such switching mechanism can easily be constructed utilizing an electronic circuit and operates independently of the picture taking frequency.

In another modification, the arrangement may utilize a peak voltage measuring arrangement of which the time constant is greater than the time period of the picture taking frequency.

Other features and advantages will be apparent from the following description of the invention, pointed out in particularity in the appended claims, and taken in connection with the accompanying drawing, in which:

Figure 1:
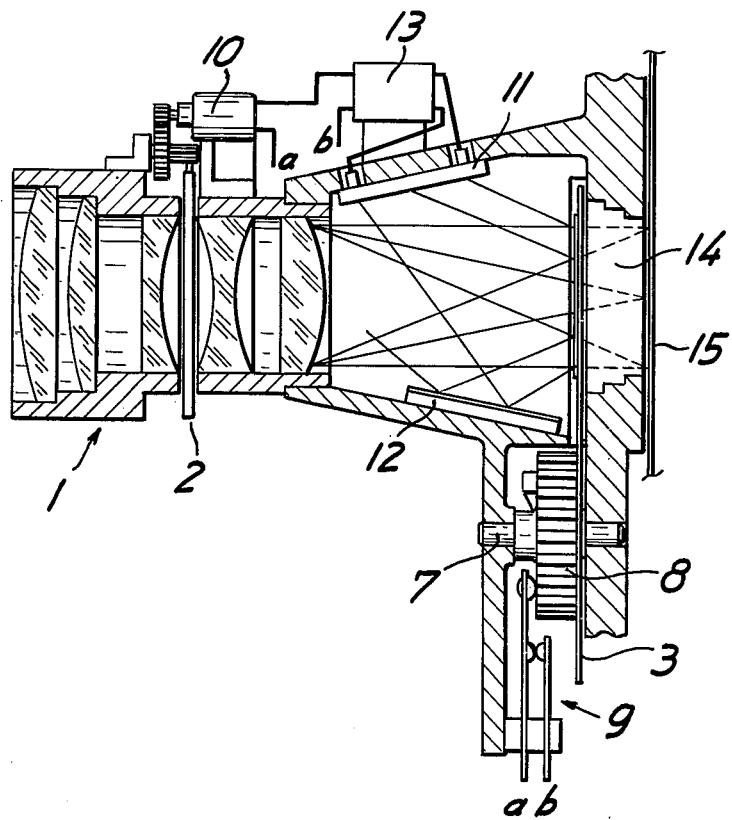
FIG. 1 is a schematic view in cross section of a motion picture camera utilizing an objective lens, a rotary shutter, and a light meter in accordance with the invention.
Figure 2:
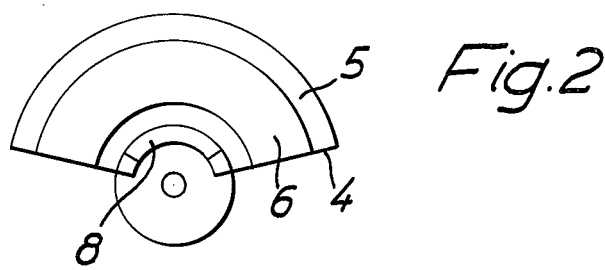
FIG. 2 is a front view of the rotary shutter blade.

The components of the camera depicted in FIG. 1 comprise the objective lens 1 with an adjustable diaphragm 2. In the optical path of the lens is a rotary shutter 3 which has a shutter blade 4. The latter is in the shape of a sector having an outer portion 5 and a similar inner portion 6 covered with a diffuse reflective layer. The outlines of the inner portion 6 are blackened so that light incident thereon is absorbed. The shutter disk 3 is mounted on a shaft 7. The conventional rotational device thereof is not shown here.

Mounted on the shaft 7 is also a ring 8 which has a cam engaging a contact pair 9 placed in the circuit of the diaphragm setting motor 10. The ring 8 is so positioned that the cam surface opens the contacts 9 during exposure time so that the diaphragm actuating motor 10 is deenergized.

Outside of the light path of the lens 10 is placed a photoreceptor element 11 and placed opposite thereto is a reflector 12. The photoreceptor 11 is connected to an amplifier 13 which energizes the motor 10.

The operation is as follows. When the camera is being used the rotary shutter 3 is activated, whereby the picture frame 14 is opened during one-half turn of the shaft 7 and covered by the outer segment 5 during the second half turn. In the covered condition, the light passing through the lens 1 is reflected by the diffuse reflector 6 and is directed at the photo receptor 11 which produces an electric potential proportional to the intensity of the light. The reflector 12 assures that stray light which would otherwise be lost also reaches the photo receptor.

When the picture window is opened, the image is projected onto the film 15; whereas, the photoreceptor 11 receives practically no light. Moreover, because the contacts 9 are opened during this time, the diaphragm actuating motor 10 is disconnected from the amplifier 13 to prevent movement of the diaphragm 2.

Figure 3:
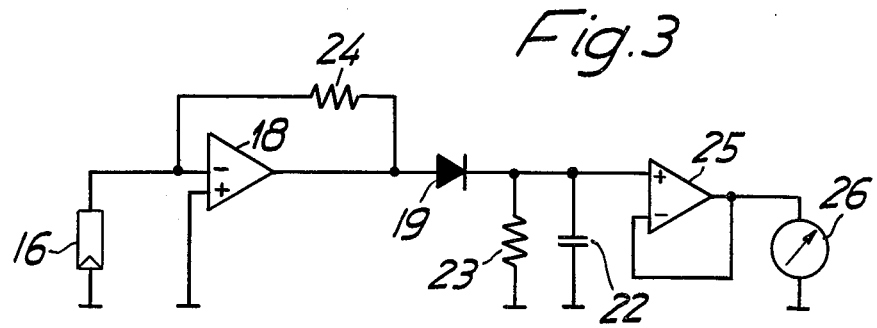
FIG. 3 is a block diagram of one form of a control circuit in accordance with the invention.

FIG. 3 shows a further modification of a light sensor in accordance with the invention. It utilizes a peak voltage measuring circuit for the setting of the diaphragm control mechanism which measures the voltage of the sensor 11 during the time the shutter is closed. The circuit consists of a photodiode 16 coupled to an operational amplifier 18. The latter has a feedback path by means of the resistor 24 and operates as a current to voltage converter of which the output voltage is proportional to the light intensity applied to the photodiode 16.

The output of the operational amplifier 18 is fed through the diode 19 to a storage condenser 22 which is connected in parallel with a resistor 23. The condenser 22 connects to the positive input of another operational amplifier 25 serving as an impedance matching device, the output of which may be fed to a motor or an indicating meter 26.

This circuit operates as follows. Upon illumination of the diode 16, a current is produced which is proportional to the light intensity. At the output of the amplifier 18, a voltage is developed which is proportional to the current produced by the diode 16. The storage condenser 22 is charged to this voltage. During the exposure phase of the camera, the light reaching the diode 16 is markedly reduced; consequently, the output voltage of the amplifier is lowered.

Under such conditions, however, the diode 19 isolates the condenser 22 from the output of amplifier 18, whereby the storage condenser 22 finds a discharge path only through the resistor 23. The time constant of this RC network, namely, resistor 23 and condenser 22, is so proportioned as to represent a multiple of the frame sequence time of the camera. At an exposure rate of 18 frames per second, the picture sequence corresponds to 55 milliseconds; therefore, 300 milliseconds would be an adequate value for the time constant. The latter would give sufficient time for the actuation of the light meter and also sufficient storage charge of the input signal during the non-exposure phase of the operation.

Figure 4:
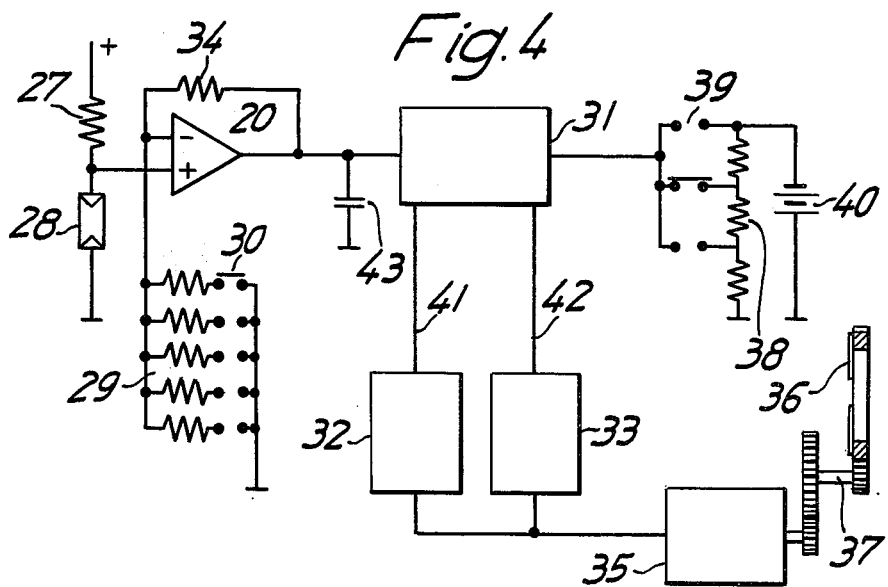
FIG. 4 is also a block diagram of a circuit in accordance with the invention, utilizing an automatic diaphragm-setting arrangement.

FIG. 4 illustrates another exposure metering circuit. The photodiode 28 forms one leg of a voltage divider in series with resistor 27 supplied with current from a source not shown.

The output of the photoresistor 28, which is proportional to the light intensity, is fed to the positive input terminal of an operational amplifier 20.

The latter has a feedback resistor 34 between the negative input terminal which connects to a plurality of resistor elements 29. Each of these may be selectively connected to ground by means of the switch 30.

The output of the amplifier 20 is applied to one terminal of the condenser 43, the other terminal thereof being grounded. Moreover, the output of the amplifier 20 is also fed to one of the inputs of a voltage comparator 31. The other input thereof connects over a switch 39 to a reference voltage source 40 supplying a divider network 38.

The comparator 31 has dual outputs 41 and 42, which alternately develop a potential, depending upon the increase or decrease of the input potential with respect to the reference voltage supplied from the source 40.

The comparator 31, for example, may be constructed by utilizing two Schmitt triggers — one of negative and the other of positive input response with regard to the reference voltage supplied by the source 40 and the network 39. Such a comparator has the characteristic of switching over only at a predetermined potential difference.

The output circuits of the comparator connect to the respective inputs of timed impulse generators 32 and 33. The outputs of these generators connect to a stepping motor; for example, if the generator 32 gives positive impulses, it will drive the stepping motor in one direction; whereas, when the generator 33 operates, it produces negative impulses which will drive the motor 35 in the reverse direction. The latter is coupled by means of a gear drive 37 to the diaphragm 36.

The circuit of FIG. 4 operates as follows. Let it be assumed that the exposure control circuit is in a pre-set condition, namely, that the diaphragm 36 is adjusted in accordance with the light condition. Now, let us say that the light has dimished. Consequently, the voltage across the photoresistor 28 will be lowered and thus the output of the operational amplifier 20 will rise. This results in a higher output voltage than the reference voltage supplied by the source 40 determined by the adjustment of the voltage divider 38. When this voltage difference reaches a predetermined value, a signal voltage appears at the output 41 which initiates operation of the timed impulse generator 32, consequently, the stepping motor 35 is set into operation. Thus the diaphragm 36 will be opened to permit more light to pass through the lens. The motor 35 will continue to operate as long as there is an output voltage at 41.

The wider opening of the diaphragm results in more light falling from the reflecting surface 6 of the shutter blade 4 onto the photoresistor 28. This results in an increased input to the amplifier 20 so that the output thereof is proportionally reduced. When the output voltage reaches the magnitude of the reference voltage, the signal voltage at 41 is cancelled. The timed impulse generator is disabled, therefore the motor 35 is stopped.

Should the light intensity become greater, the voltage across the photoresistor 28 will increase. Consequently, the output voltage of the amplifier 20 will be lower. In this condition, at a given magnitude, the output at conductor 42 activates the timed impulse generator 33. Now the stepping motor 35 operates in reverse. Thus the diaphragm 36 will close, step by step, until the reference voltage and the output voltage of the amplifier 20 equalize.

The resistors 38 in the network 39 operate as reverse biasing means for the amplifier 20. By this means the exposure control may be pre-set for films of various speeds.

The reference voltages derived from the network 39 may be selected for exposure in accordance with the picture frequency and film material, including operation in daylight or artificial light.

This invention in its broader aspects is not limited to the specific embodiments herein shown and described but departure may be made within the scope of the accompanying claims, without departing from the principles of the invention and without sacrificing its chief advantages.

What is claimed is:

1. An exposure control mechanism for motion picture cameras including an objective lens, a diaphragm for regulating the light passing through said lens, an electronic control circuit including a photosensor and motor means coupled to said diaphragm, a picture frame, a shutter having a sector blade periodically covering said frame during operation of said shutter, light reflector means on said blade, said photosensor being located within said camera and positioned to receive light from said reflector means, whereby said control circuit initiates operation of said motor means in accordance with the intensity of light received from said reflector means during the time said frame is covered by said sector, and switching means coupled to said shutter disabling said motor means during the time period said frame is uncovered by said sector blade, said electronic control circuit utilizing a storage condenser receiving a charge voltage pulse from the sequential periodic illumination of said photosensor, said condenser being connected to a resistor forming therewith an RC network, the time constant of which is a multiple of the periodic frame sequence exposure time of said camera.

2. A mechanism in accordance with claim 1 wherein said control circuit utilizes a selectable reference voltage source, a voltage comparator receiving one input determined by said photosensor and another input from said reference voltage source, the respective polarity of the output of said comparator being utilized for controlling the direction of rotation of said motor coupled to said diaphragm.

* * * * *